(12) United States Patent
Wang et al.

(10) Patent No.: US 9,335,803 B2
(45) Date of Patent: May 10, 2016

(54) CALCULATING A DYNAMICALLY CHANGEABLE MAXIMUM OPERATING VOLTAGE VALUE FOR A PROCESSOR BASED ON A DIFFERENT POLYNOMIAL EQUATION USING A SET OF COEFFICIENT VALUES AND A NUMBER OF CURRENT ACTIVE CORES

(71) Applicant: Intel Corporation, Santa Clara, CA (US)

(72) Inventors: Zhiguo Wang, Palo Alto, CA (US); David J. Ayers, Fremont, CA (US); Srikanth Balasubramanian, Santa Clara, CA (US); Sukirti Gupta, Santa Clara, CA (US); Stefan Rusu, Santa Clara, CA (US); Stephen M. Ramey, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 13/768,633

(22) Filed: Feb. 15, 2013

(65) Prior Publication Data

US 2014/0237267 A1    Aug. 21, 2014

(51) Int. Cl.
*G06F 1/00* (2006.01)
*G06F 1/26* (2006.01)
*G06F 1/32* (2006.01)
*G06F 1/20* (2006.01)
*G06F 9/50* (2006.01)

(52) U.S. Cl.
CPC ........ *G06F 1/26* (2013.01); *G06F 1/206* (2013.01); *G06F 1/32* (2013.01); *G06F 1/3206* (2013.01); *G06F 1/3296* (2013.01); *G06F 9/50* (2013.01); *G06F 9/5094* (2013.01)

(58) Field of Classification Search
CPC ....... G06F 1/3203; G06F 1/324; G06F 1/206; G06F 1/26; G06F 1/3206; G06F 1/32; G06F 9/50; G06F 9/5094
See application file for complete search history.

(56) References Cited

U.S. PATENT DOCUMENTS

| 5,163,153 | A | 11/1992 | Cole et al. |
|---|---|---|---|
| 5,522,087 | A | 5/1996 | Hsiang |
| 5,590,341 | A | 12/1996 | Matter |
| 5,621,250 | A | 4/1997 | Kim |

(Continued)

FOREIGN PATENT DOCUMENTS

| CN | 102667744 | 9/2012 |
|---|---|---|
| EP | 1 282 030 A1 | 5/2003 |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scaling for a Multiple Clock Domain Microprocessor," 2003, pp. 1-12.

(Continued)

*Primary Examiner* — Thomas Lee
*Assistant Examiner* — Zhipeng Wang
(74) *Attorney, Agent, or Firm* — Trop, Pruner & Hu, P.C.

(57) ABSTRACT

In an embodiment, a processor includes voltage calculation logic to calculate a plurality of maximum operating voltage values each associated with a number of active cores of the plurality of cores, based at least in part on a plurality of coefficient values. In this way, the processor can operate at different maximum operating voltages dependent on the number of active cores. Other embodiments are described and claimed.

12 Claims, 10 Drawing Sheets

(56) References Cited

U.S. PATENT DOCUMENTS

| | | |
|---|---|---|
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0046400 A1* | 3/2005 | Rotem ............ 323/234 |
| 2005/0132238 A1 | 6/2005 | Nanja |
| 2005/0289365 A1 | 12/2005 | Bhandarkar |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0149975 A1* | 7/2006 | Rotem et al. ............ 713/300 |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0234075 A1* | 10/2007 | Zimmer et al. ............ 713/300 |
| 2007/0239398 A1 | 10/2007 | Song et al. |
| 2007/0245163 A1 | 10/2007 | Lu et al. |
| 2007/0260899 A1* | 11/2007 | Burton ............ 713/300 |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0089543 A1* | 4/2009 | Gunther et al. ............ 712/30 |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0235611 A1* | 9/2010 | Yamashita ............ 712/220 |
| 2011/0154090 A1 | 6/2011 | Dixon et al. |
| 2011/0191602 A1* | 8/2011 | Bearden et al. ............ 713/300 |
| 2011/0213991 A1 | 9/2011 | Wolfe et al. |
| 2011/0213998 A1* | 9/2011 | Mathieson et al. ............ 713/324 |
| 2012/0066535 A1 | 3/2012 | Naffziger |
| 2012/0072746 A1* | 3/2012 | Sotomayor ............ 713/320 |
| 2012/0079290 A1 | 3/2012 | Kumar |
| 2012/0246506 A1 | 9/2012 | Knight |

OTHER PUBLICATIONS

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State ", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor ", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

U.S. Appl. No. 13/724,732, filed Dec. 21, 2012, entitled, "Controlling Configurable Peak Performance Limits of a Processor," by Jeremy J. Shrall, et al.

Great Britain Patent Office Action Mailed Jul. 7, 2014, in Great Britain Application No. GB1401502.8.

Korean Patent Office, Office Action Mailed May 11, 2015, in Korean Patent Application No. 10-2014-17241.

Japan Patent Office, Office Action mailed Dec. 16, 2014, in Japanese Application No. 2014-014328.

German Patent and Trademark Office, Office Action mailed Nov. 12, 2015 in German Patent Application No. 10 2014 001 914.4.

State Intellectual Property Office, P.R. China, Office Action mailed Jan. 28, 2016, in Chinese Patent Application No. 201410049126.8.

* cited by examiner

CALCULATING A DYNAMICALLY CHANGEABLE MAXIMUM OPERATING VOLTAGE VALUE FOR A PROCESSOR BASED ON A DIFFERENT POLYNOMIAL EQUATION USING A SET OF COEFFICIENT VALUES AND A NUMBER OF CURRENT ACTIVE CORES

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

For semiconductors such as processors, maximum frequency or performance is usually limited by either a thermal design power (TDP) or by gate oxide reliability. With multicore processors, maximum frequency or performance tends to be power limited when all cores are active, and tends to be limited by gate oxide reliability with a single core running. In general a multicore processor has a fixed core operating voltage, determined based on a usage model. Gate oxide failure rate tends to be much less than a gate oxide failure target if a customer operates the processor with only a single core active. Conversely, the gate oxide failure rate tends to be much larger than the gate oxide failure target if a customer operates the processor with all cores active. Thus in the second scenario, a gate oxide failure rate exceeds a target rate. And in the first scenario, performance is lost as operating voltage in a single core scenario is not optimized.

DETAILED DESCRIPTION

In various embodiments, a maximum operating voltage for operation of a processor or other semiconductor device may be dynamically programmed. In many embodiments, this maximum operating voltage may be based at least in part on an activity level of the processor. For one such embodiment, the maximum operating voltage may be determined based on the number of active cores of a multicore processor. Different manners of obtaining this operating voltage may occur. For example, a processor may store a set of fixed maximum operating voltage values. Or a power controller such as a power control unit (PCU) of a processor may dynamically determine these values. In any event, based on this information and additional processor constraints and/or reliability conditions, this PCU may determine a resolved operating voltage based on how many cores are used at the moment. In this way, a processor may achieve higher operating frequency and performance at low core counts, and ensure reliability across all core configurations. By dynamically determining the set of maximum operating voltages, the number of fuses used to calculate the optimal voltage may be reduced.

In contrast, many processors apply a constant maximum operating voltage (Vmax) across all core count configurations. For example, a 15 core product would have the same Vmax when operating with all 15 cores active as it would when it has only one core active. When such a processor is operating with all the cores active, the operating voltage is often limited by the thermal power limit and hence does not challenge the reliability of the Vmax specification. However, single core operations consume much less power and hence Vmax becomes the limiter to performance.

Embodiments eliminate the Vmax headroom available at higher core counts, and enable use of this headroom at lower core counts, thereby increasing voltage at lower core counts, without affecting high core count performance. Embodiments may further equalize a failure rate (e.g., defects per million (DPM)) across all core count configurations by programming operating voltage as a function of the number of active cores. Consider a processor with N cores. A customer can choose to operate any number of cores out of N cores. Core operating voltage for each core configuration can be chosen in such a way that the gate oxide failure rate among the different core configurations is the same as the target failure rate, given by:

$$P_{fail}(V1,T1,1,t)=P_{fail}(V2,T2,2,t)=\ldots=P_{fail}(Vm,Tm,m,t)\ldots=P_{fail}(Vn,Tn,n,t)=\text{Target failure rate}$$

Here $P_{fail}(Vm,Tm,m,t)$ is the gate oxide failure rate at time t, at temperature Tm, at voltage Vm, when m cores are active.

Figure 1A:
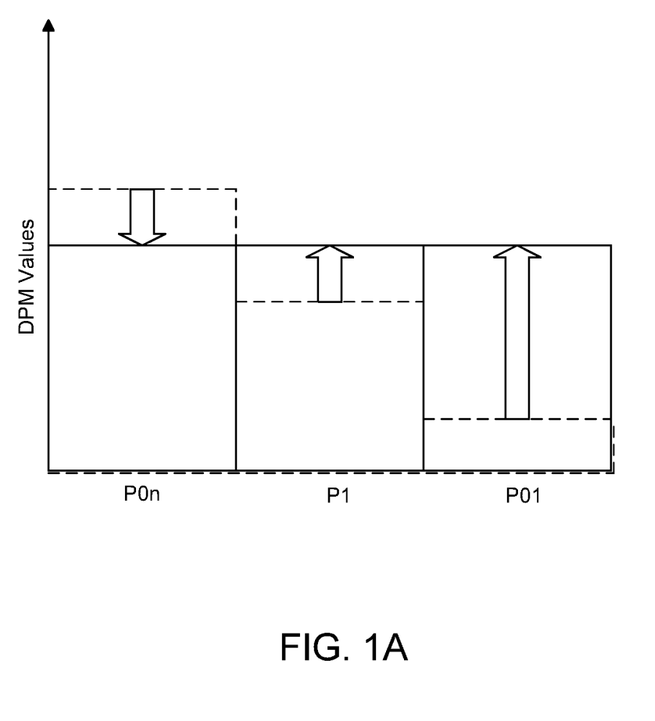
FIG. 1A is a graphical illustration of operation of a processor in accordance with an embodiment of the present invention.

Referring now to FIG. 1A, shown is a graphical illustration of operation of a processor in accordance with an embodiment of the present invention in which a failure rate is equalized across all core configurations. In other words, regardless of the number of active cores (shown as all cores active (P0n) to a single active core (P01)), the failure rate maintains at a fixed value, shown with the solid line in FIG. 1A. In contrast, using a fixed maximum operating voltage, the failure rate varies depending on performance level (e.g., number of active cores), shown with dashed lines in FIG. 1A.

Figure 1B:
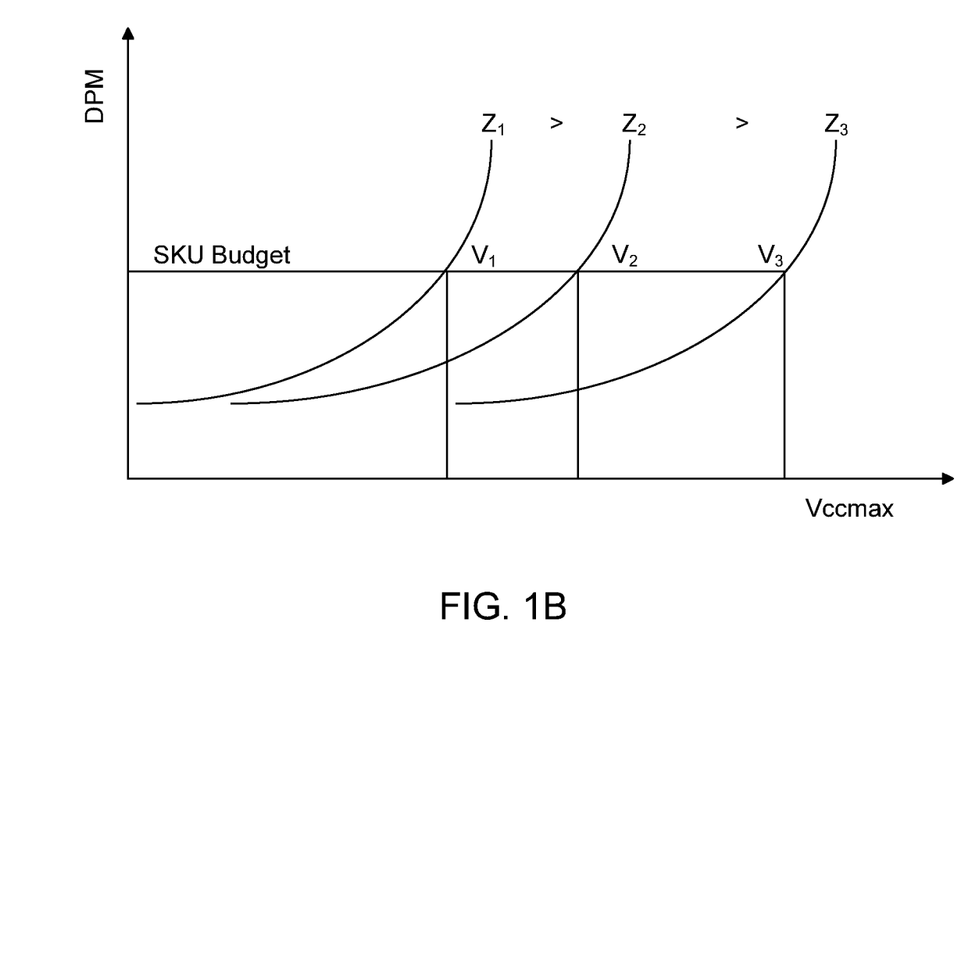
FIG. 1B is another graphical illustration of operation of a processor in accordance with an embodiment of the present invention.

As shown in FIG. 1B, with a fixed gate oxide failure rate across all core configurations of a multicore processor, a maximum operating voltage is a function of the total amount of transistor width exposed to the operating voltage. At lower total device widths (lower z values in FIG. 1B), a higher maximum operating voltage is realized for a given stock keeping unit (SKU) failure rate budget, in that a smaller amount of transistor size is exposed to the voltage.

Using an embodiment of the present invention, when only a single core (or a small number of cores) of a multicore processor is active, the core(s) may operate at a higher operating voltage. In one particular example, the core may operate at approximately 30 millivolts (mV) higher, for example, at 1.03 V instead of 1.0 V. In this way, a greater operating frequency may be achieved in a turbo mode of operation. In this same example, the single core operating in a turbo mode may operate at a frequency that is a bin higher (where in an embodiment a bin corresponds to 100 megahertz (MHz)) than if a single maximum operating voltage were specified for the processor. Embodiments may also enable resulting products to be more reliable as a target failure rate is met at all core configurations, and therefore is independent of how a customer actually uses the product.

Figure 2A:
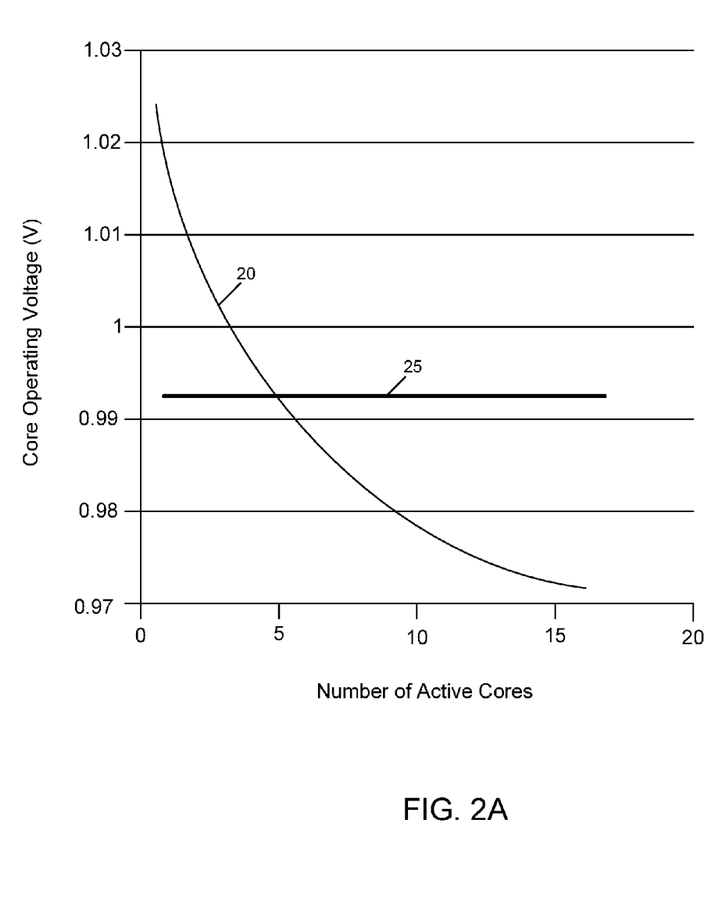
FIG. 2A is a graphical illustration associating maximum operating voltage with number of active cores in accordance with an embodiment of the present invention.

Referring now to FIG. 2A, shown is a graphical illustration associating maximum operating voltage with number of active cores. As seen, using an embodiment of the present invention a variable maximum operating voltage can be achieved dependent on the number of active cores, as illustrated in curve 20. In contrast, a conventional processor provides a single maximum operating voltage, regardless of number of active cores as illustrated in curve 25.

Figure 2B:
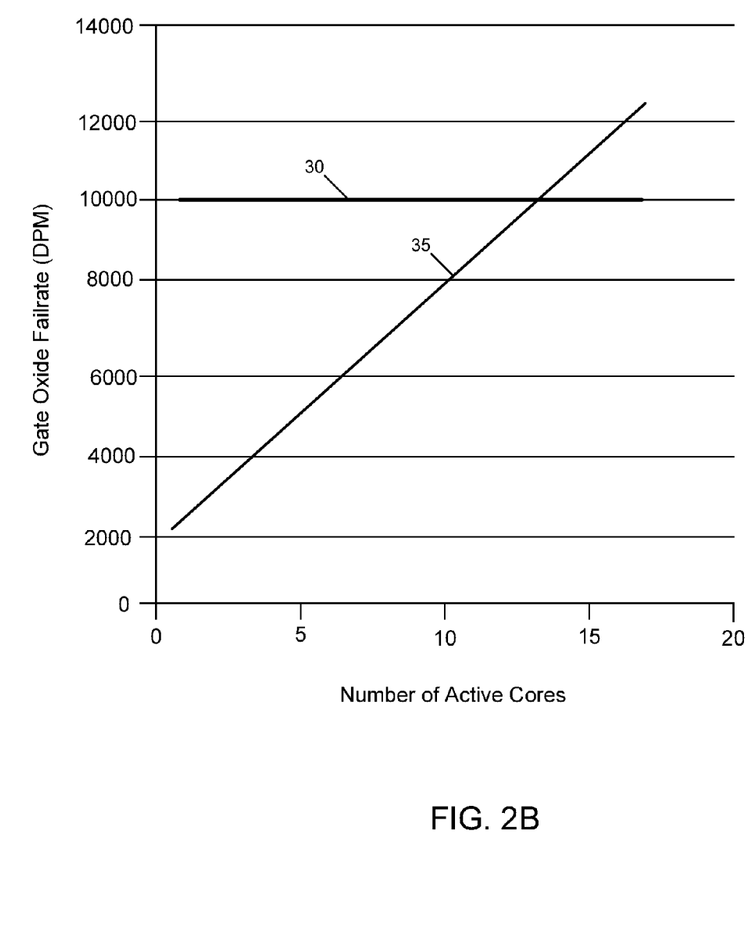
FIG. 2B is a graphical illustration of a target gate oxide failure rate per number of active cores in accordance with an embodiment of the present invention.

Referring now to FIG. 2B, shown is a graphical illustration of a target gate oxide failure rate per number of active cores. Using an embodiment of the present invention, a fixed target rate may be achieved regardless of number of active cores, as seen in curve 30. In contrast, by using a fixed operating voltage regardless of number of cores as in a conventional processor, a widely varying target failure rate may result, as seen in curve 35.

Figure 3:
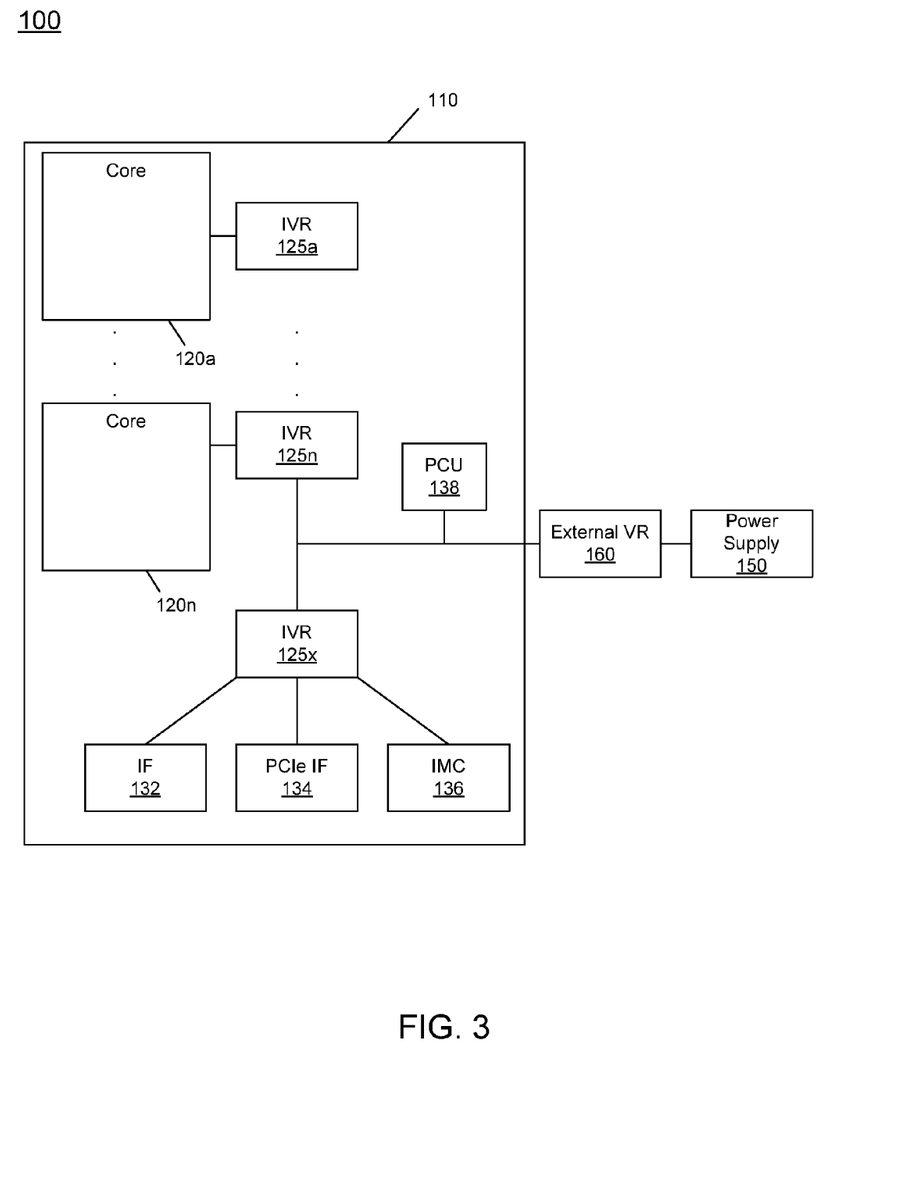
FIG. 3 is a block diagram of a portion of a system in accordance with an embodiment of the present invention.

Referring now to FIG. 3, shown is a block diagram of a portion of a system in accordance with an embodiment of the present invention. As shown in FIG. 3, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple cores 120a-120n. In addition, each core may be associated with an individual voltage regulator 125a-125n to allow for fine-grained control of voltage and thus power and performance of each individual core. As such, each core can operate at an independent voltage and frequency, enabling great flexibility and affording wide opportunities for balancing power consumption with performance.

Still referring to FIG. 3, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to dynamically control a maximum operating voltage and/or other operating parameter based on a number of active cores in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 110 such as additional uncore logic and other components such as internal memories, e.g., one or more levels of a cache memory hierarchy and so forth. Furthermore, while shown in the implementation of FIG. 3 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the configurable voltage and/or other operating parameter control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Although the scope of the present invention is not limited in this regard, in an embodiment a lookup table of voltages may be provided to store a set of maximum operating voltages, each a function of the number of cores. This set of voltages may be determined during design or characterization of a product and stored in a non-volatile storage. However, given increasing core counts and the amount of testing to populate the table, in other embodiments the set of Vmax values may be modeled based on a core count, e.g., according to a linear equation, a polynomial equation, or other curve fitting. In an embodiment, a PCU may calculate this set of maximum operating voltage values according to one or more equations. Such equations may use a set of coefficient values that are determined during device characterization and stored into the processor during manufacturing/testing.

While in some embodiments a third order polynomial may be used to calculate a maximum operating voltage for a given number of active cores, in other embodiments a first order function may instead be used, in order to reduce fuse bit requirements.

Figure 4:
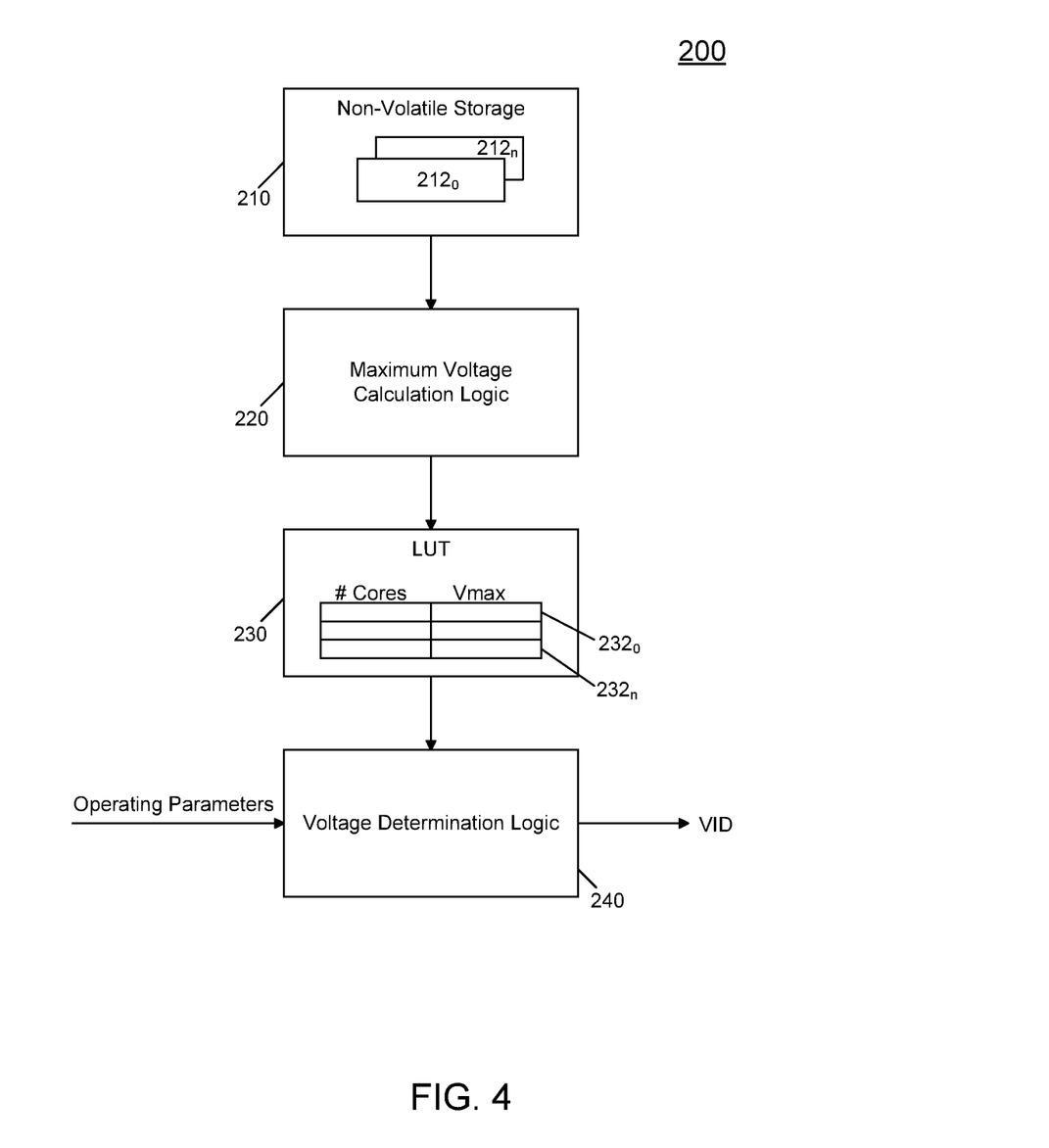
FIG. 4 is a block diagram illustrating a voltage control logic in accordance with an embodiment of the present invention.

Referring now to FIG. 4, shown is a block diagram illustrating a voltage control logic in accordance with an embodiment of the present invention. As shown in FIG. 4, logic 200 may be part of a processor, and more particularly may be present in a logic of a PCU. In general, logic 200 operates to determine an operating voltage at which active cores of the processor can operate. More specifically, based on a variety of different information, logic 200 may calculate an operating voltage in the form of a so-called voltage ID (VID) that is a digital code that can be provided to one or more voltage regulators to enable the one or more voltage regulators to generate an operating voltage at the appropriate voltage level. In general, a voltage regulation module receiving this VID converts the value into an operating voltage to be supplied to circuitry powered by the voltage regulator. It is noted that while embodiments described herein enable a dynamically changeable maximum operating voltage to be applied based on a number of cores, understand that other portions of a processor, such as a system agent domain or other processor circuitry may operate at a fixed operating voltage. In addition, other processor circuitry such as a graphics domain including one or more graphics processors may also benefit from dynamically changeable maximum operating voltages as described herein. Thus although the embodiments described herein are with reference to controlling maximum operating voltage based on a number of active cores, a similar analysis may be performed based on a number of active graphics processors or other processing engines of a multi-domain processor.

As seen in FIG. 4, logic 200 includes various components. First, a non-volatile storage 210 may include a plurality of coefficient values $212_0$-$212_n$. Non-volatile storage 210 may in an embodiment be a fuse-based storage or other non-volatile storage of the processor written or fused during manufacture of the semiconductor die. In general, these coefficient values may be used to determine a maximum operating voltage for a given number of active cores of the processor. That is, as described herein rather than a single fixed maximum operating voltage, a set of maximum operating voltages can be calculated and used in determining an actual operating voltage for the amount of active cores during dynamic operation.

Note that while coefficient values are described herein as being stored within non-volatile storage 210, understand the scope of the present invention is not limited in this regard and in other embodiments, to reduce computation expense (at the expense of greater storage requirements) instead of coefficient values, a set of maximum operating voltages each associated with a given number of active cores may be stored in non-volatile storage 210.

In the implementation shown, non-volatile storage 210 is coupled to a maximum voltage calculation logic 220. Logic 220 may be configured to determine a maximum operating voltage for each possible number of active cores, using the coefficient values obtained from non-volatile storage 210. In an embodiment, for each possible number of active cores logic 220 may perform a different calculation using the coefficient values in a given equation such as a given polynomial equation. Although the scope of the present invention is not limited in this regard in an embodiment, a first order polynomial equation may be used for at least some of the maximum operating voltage calculations, while second or third order polynomial calculations may be used for others of the maximum operating voltage calculations. Logic 220 may thus calculate a plurality of maximum operating voltage values, each of which can be stored in a corresponding one of a plurality of entries $232_0$-$232_n$ of a lookup table 230. In an embodiment, lookup table 230 may be implemented within a storage of a PCU or other portion of a processor.

Still referring to FIG. 4, during normal processor operation based on a number of active cores and various operating parameters of the processor such as temperature, power consumption level, thermal design point (TDP), electrical design point (EDP) as well as other operating parameters, a voltage determination logic 240 may determine an appropriate operating voltage at which the cores of the processor are to be dynamically operated. In an embodiment, logic 240 may perform a minimum operation such that the resolved voltage is a minimum of the maximum operating voltage obtained from lookup table 230 for the given number of active cores and other voltage values based on the various processor constraints including TDP, EDP and so forth. This determined voltage may be in the form of a VID value which in turn can be provided to one or more voltage regulators, as discussed above. Although shown at this high level in the embodiment of FIG. 4, understand the scope of the present invention is not limited in this regard. For example, in another embodiment, logic 200 may instead be implemented using fused maximum operating values, each associated with a different number of active cores (which may be stored in non-volatile storage 210) and voltage determination logic 240, avoiding the need in such embodiment for maximum voltage calculation logic 220 and lookup table 230. Of course still other implementations are possible.

Figure 5A:
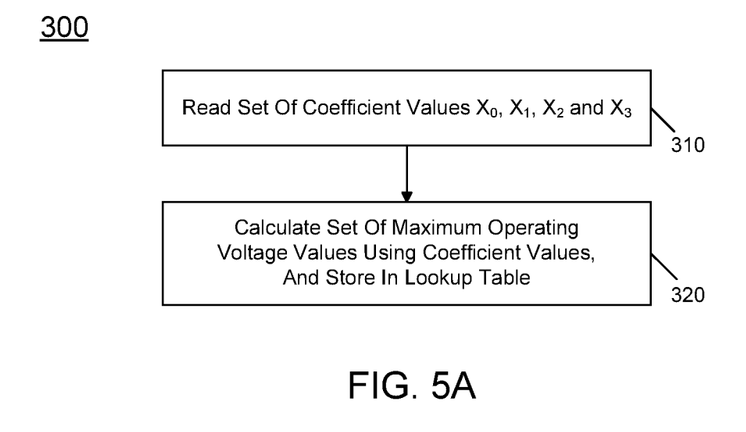
FIG. 5A is a flow diagram of a method for calculating a maximum operating voltage in accordance with an embodiment of the present invention.

Referring now to FIG. 5A, shown is a flow diagram of a method for calculating a maximum operating voltage in accordance with an embodiment of the present invention. As shown in FIG. 5A, method 300 may be performed by logic of a processor. More specifically in an embodiment method 300 may be performed by voltage control logic of a PCU. However, understand that in other embodiments this logic can be implemented as a standalone logic or as part of another portion of a processor. In general, method 300 may be used to calculate a set of maximum operating voltage values, which may be performed per reset sequence of a processor (e.g., during a power on sequence of the processor).

Method 300 may begin by reading a set of coefficient values (block 310). In an embodiment, these coefficient values may be obtained from a non-volatile storage such as a fuse storage, which are written during manufacture. In the embodiment shown in FIG. 5A, four such coefficient values $x_0$-$x_3$ may be read. Then at block 320 a set of maximum operating voltage values can be calculated and stored in a storage. In an embodiment, the storage may be a lookup table within the PCU that includes a plurality of entries each associating a number of active cores with a corresponding maximum operating voltage. A different calculation may be made for each number of active cores using the same set of coefficient values, in an embodiment. For example, in one embodiment for one active core, a first polynomial equation, namely $x_0+x_1+x_2+x_3$, may be used to generate the corresponding maximum operating voltage value. For two active cores a different polynomial equation, namely $x_0+2x_1+4x_2+8x_3$, may be used. Finally for N active cores, yet another polynomial equation, namely $x_0+x_1n+x_2n^2+x_3n^3$, may be used to determine a maximum operating voltage value. Note that these operations performed in block 310 and 320 may be performed a single time for a power-on event of a processor.

Figure 5B:
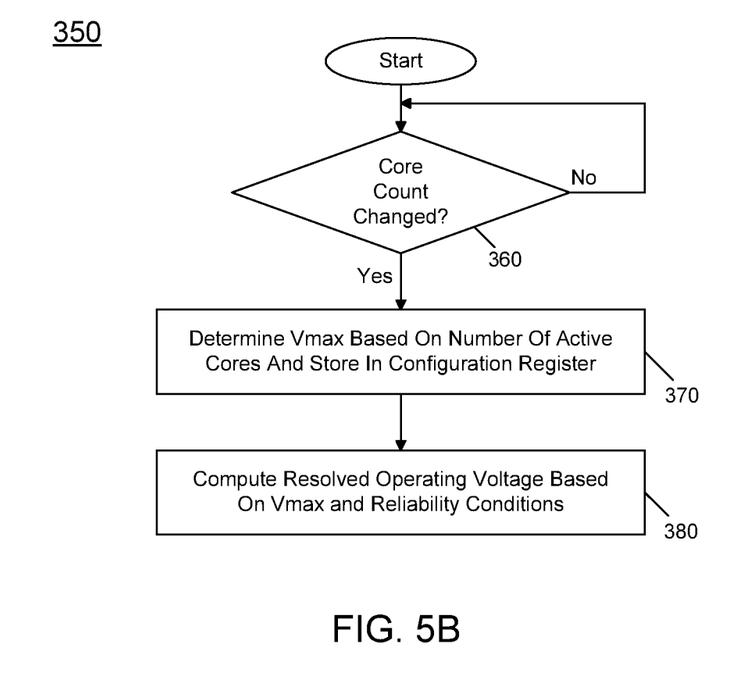
FIG. 5B is a flow diagram of a method for dynamically determining an operating voltage for a processor in accordance with one embodiment of the present invention.

Referring now to FIG. 5B, shown is a flow diagram of a method for dynamically determining an operating voltage for a processor in accordance with an embodiment of the present invention. Method 350 may, in an embodiment, be performed by voltage control logic of a PCU. As seen, at diamond 360 it can be determined whether a core count has changed. In an embodiment, such a change in core count may occur when system software (such as an OS, firmware, VMM or even application) makes requests of a PCU to have cores enter into different activity states. If it is determined that the core count has changed, control passes to block 370 where an appropriate maximum operating voltage ($V_{max}$) may be determined based on the number of active cores. That is during normal operation, the processor may continuously track the number of cores active and access the corresponding Vmax limit from the lookup table. In an embodiment, based on the number of active cores, the lookup table can be accessed and the corresponding maximum operating voltage value can be obtained. In an embodiment, this obtained maximum operating voltage value may be stored in a configuration storage such as a configuration register of the PCU.

Next control passes to block 380 where an actual operating voltage value may be determined based at least in part on this maximum operating voltage value. More specifically, a VID may be determined based on various reliability conditions of the processor, which may cause an operating voltage to be determined that is lower than the available maximum operating voltage. Examples of reliability of conditions or constraints include TDP, EDP, thermal design current ($I_{ccmax}$) and processor temperature. Although shown at this high level in the embodiment of FIG. 5B, understand the scope of the present invention is not limited in this regard.

Using an embodiment of the present invention, excessive usage model dependent wearout may be reduced. In contrast, a conventional scheme requires certain assumptions to be made on the usage model, particularly in the amount of the time the processor spends in P-states such as P1, P0, Pn etc. These time-in-use conditions are often averaged based on past statistics and particular use conditions that do not conform to this average-based assumption, which may cause wear-out beyond specifications. Embodiments thus enable higher Vmax and corresponding higher single thread/low core count performance without increasing gate oxide DPM.

Figure 6:
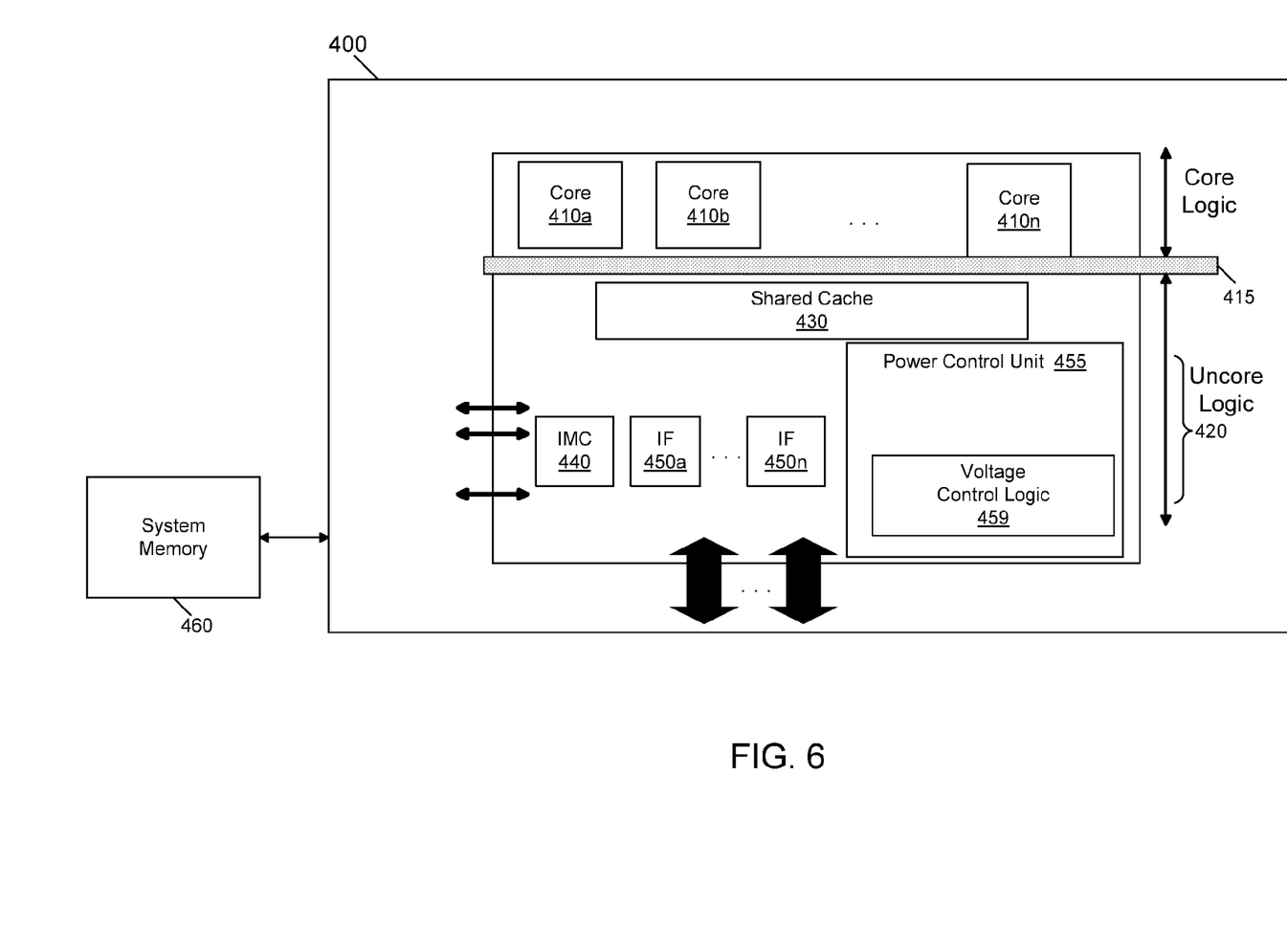
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 400 may be a multicore processor including a plurality of cores 410a-410n. In one embodiment, each such core may be of an independent power domain and can be configured to enter and exit active states and/or turbo modes based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a voltage control logic 459 in accordance with an embodiment of the present invention. As described above, this logic is configured to determine a set of maximum operating values and to dynamically limit an actual operating voltage (depending on a number of active cores) to a resolved value that may be lower than a corresponding maximum operating voltage value for the active number of cores.

With further reference to FIG. 6, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Figure 7:
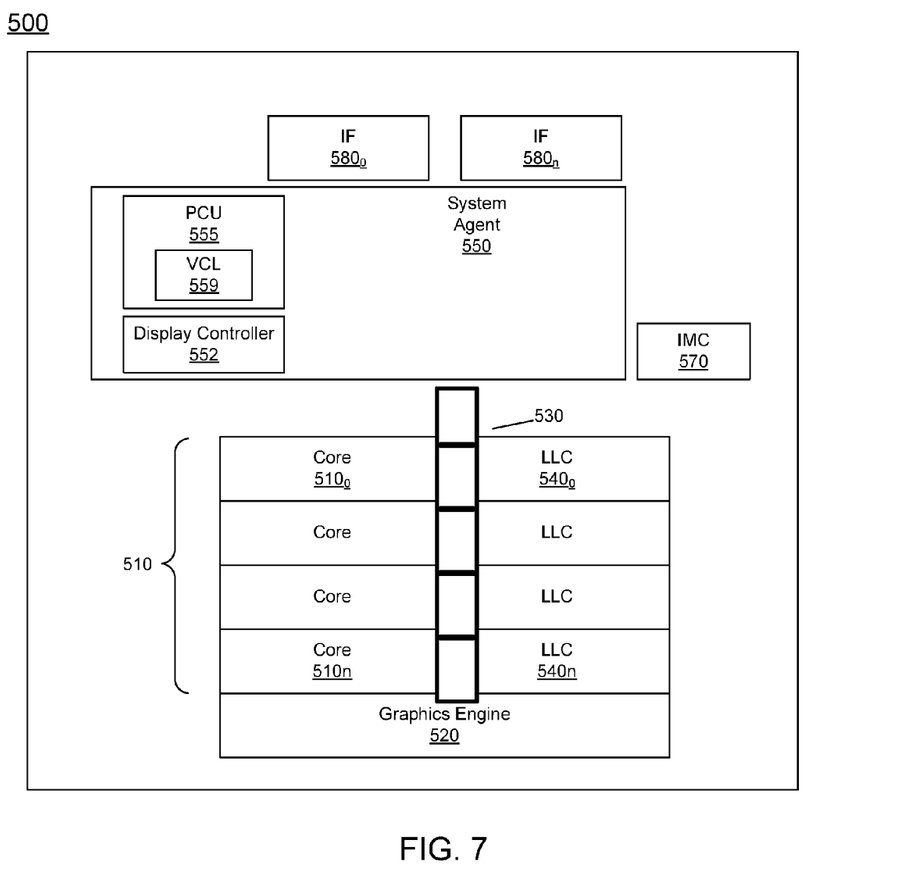
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a voltage control logic 559 in accordance with an embodiment of the present invention to enable configurable dynamic control of maximum operating voltage as described herein. In various embodiments, this logic may be configured as in FIG. 4 and may execute the algorithms described above in FIGS. 5A and 5B.

As further seen in FIG. 7, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
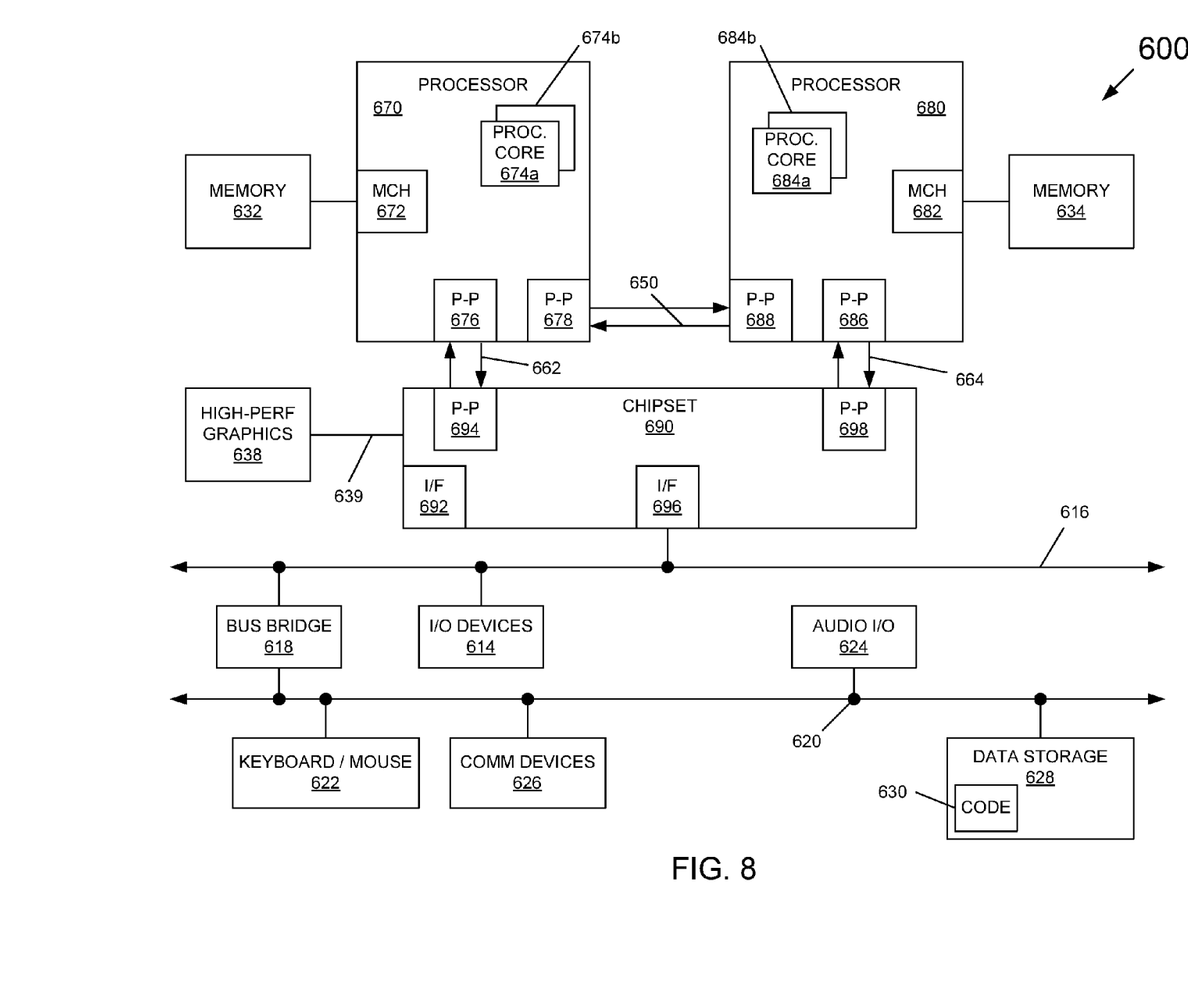
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform dynamic operating voltage control, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Embodiments can be incorporated into other types of systems including mobile devices such as a smart cellular telephone, tablet computer, netbook, Ultrabook™, or so forth.

The following examples pertain to further embodiments. In one example, a processor comprises a core domain including a plurality of cores each to execute instructions, a non-volatile storage to store a plurality of coefficient values, and voltage calculation logic to calculate a plurality of maximum operating voltage values each associated with a number of active cores of the plurality of cores, based at least in part on the plurality of coefficient values.

In an example, a power controller is to determine an operating voltage for the number of active cores based on the corresponding maximum operating voltage value and at least one processor constraint.

In an example, the plurality of coefficient values is obtained during initialization of the processor.

In an example, the power controller is to determine the operating voltage based on the number of active cores of the plurality of cores, and prevent a first core from execution at a maximum operating voltage value associated with the number of active cores based on the at least one processor constraint.

In an example, the voltage calculation logic is to perform a first polynomial operation using the coefficient values to calculate a first maximum operating voltage value for a first number of active cores.

In an example, the voltage calculation logic is to perform a second polynomial operation using the coefficient values to calculate a second maximum operating voltage value for a second number of active cores.

In an example, the voltage calculation logic is to store the first maximum operating voltage value in a first entry of a lookup table and to store the second maximum operating voltage value in a second entry of the lookup table.

In an example, the processor further comprises a power controller to access the first entry when the first number of active cores are active and to determine an operating voltage for the first number of active cores based at least in part on the first maximum operating voltage value.

Note that the above processor can be implemented using various means.

In an example, the processor comprises a system on a chip (SoC) incorporated in a user equipment touch-enabled device.

In another example, a machine-readable medium having stored thereon instructions, which if performed by a machine cause the machine to perform a method comprising determining a maximum operating voltage for a processor based on a number of active cores of the processor, responsive to a change in the number of active cores, and computing a resolved operating voltage for the processor based on the maximum operating voltage and at least one constraint of the processor.

In an example, the method further comprises accessing a table based on the number of active cores and obtaining the maximum operating voltage from the table.

In an example, the method further comprises computing the resolved operating voltage to be the maximum operating voltage when there are no constraints on the processor.

In an example, the method further comprises reading a set of coefficient values from a non-volatile storage of the processor.

In an example, the method further comprises calculating a set of maximum operating voltage values using the set of coefficient values, each of the set of maximum operating voltage values calculated according to a different equation using the set of coefficient values, and storing the set of maximum operating voltage values in a table.

In an example, the method further comprises accessing the table based on the number of active cores and obtaining the maximum operating voltage from the table.

In an example, the method further comprises enabling a single core of the processor to operate at a first operating voltage, and thereafter enabling a plurality of cores of the processor to operate at a second operating voltage, the first operating voltage greater than the second operating voltage.

In an example, an apparatus comprises means for performing the method as described above.

In another example, a system comprises a multicore processor including a plurality of cores, a storage to store a plurality of maximum operating voltage values, each of the plurality of maximum operating voltage values a function of a number of active cores, and a voltage control logic to dynamically control an operating voltage to be a corresponding one of the maximum operating voltage values or a clip voltage value, the clip voltage value based on at least one of a plurality of processor constraints, and a dynamic random access memory (DRAM) coupled to the multicore processor.

In an example, voltage calculation logic is to calculate the plurality of maximum operating voltage values based at least in part on a plurality of coefficient values.

In an example, the voltage calculation logic is to perform a first polynomial operation using the plurality of coefficient values to calculate a first maximum operating voltage value for a first number of active cores, and to perform a second polynomial operation using the plurality of coefficient values to calculate a second maximum operating voltage value for a second number of active cores.

In an example, the voltage control logic is to enable a single core of the plurality of cores to operate at a first operating voltage and enable two or more of the plurality of cores to operate at a second operating voltage, the first operating voltage greater than the second operating voltage.

In an example, the storage comprises a non-volatile storage.

In an example, a computer readable medium including instructions is to perform the method of any of the above examples.

In another example, a processor comprises a core domain including a plurality of cores each to execute instructions, a non-volatile storage to store a plurality of coefficient values, and voltage calculation means for calculating a plurality of maximum operating voltage values each associated with a number of active cores of the plurality of cores, based at least in part on the plurality of coefficient values.

In an example, a power control means is for determining an operating voltage for the number of active cores based on the corresponding maximum operating voltage value and at least one processor constraint.

In an example, the plurality of coefficient values is obtained during initialization of the processor.

In an example, the power control means is to determine the operating voltage based on the number of active cores of the plurality of cores, and prevent a first core from execution at a maximum operating voltage value associated with the number of active cores based on the at least one processor constraint.

In an example, the voltage calculation means is to perform a first polynomial operation using the coefficient values to calculate a first maximum operating voltage value for a first number of active cores.

In an example, the voltage calculation means is to perform a second polynomial operation using the coefficient values to calculate a second maximum operating voltage value for a second number of active cores.

In an example, the voltage calculation means is to store the first maximum operating voltage value in a first entry of a lookup table and to store the second maximum operating voltage value in a second entry of the lookup table.

In an example, the processor further comprises a power control means for accessing the first entry when the first number of active cores are active and determining an operating voltage for the first number of active cores based at least in part on the first maximum operating voltage value.

In another example, a system comprises a display and a memory, and including the processor of one or more of the above examples.

In another example, a method comprises determining a maximum operating voltage for a processor based on a number of active cores of the processor, responsive to a change in the number of active cores, and computing a resolved operating voltage for the processor based on the maximum operating voltage and at least one constraint of the processor.

In an example, the method comprises computing the resolved operating voltage to be the maximum operating voltage when there are no constraints on the processor.

In an example, the method further comprises reading a set of coefficient values from a non-volatile storage of the processor, calculating a set of maximum operating voltage values using the set of coefficient values, each of the set of maximum operating voltage values calculated according to a different equation using the set of coefficient values, and storing the set of maximum operating voltage values in a table.

In an example, the method comprises enabling a single core of the processor to operate at a first operating voltage, and thereafter enabling a plurality of cores of the processor to operate at a second operating voltage, the first operating voltage greater than the second operating voltage.

In another example, a computer readable medium including instructions is to perform the method of any of the above examples.

In another example, an apparatus comprises means for performing the method of any one of the above examples.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core domain including a plurality of cores each to execute instructions;
a non-volatile storage to store a plurality of coefficient values;
voltage calculation logic to calculate a plurality of dynamically changeable maximum operating voltage values each associated with a number of active cores of the plurality of cores based at least in part on the plurality of coefficient values and store the calculated plurality of dynamically changeable maximum operating voltage values in a second storage, wherein the voltage calculation logic is to use a first polynomial equation, a first number of active cores and the plurality of coefficient values to calculate a first dynamically changeable maximum operating voltage value for the first number of active cores and use a second polynomial equation, a second number of active cores and the plurality of coefficient values to calculate a second dynamically changeable maximum operating voltage value for the second number of active cores; and
a power controller to dynamically determine an operating voltage for the number of active cores based on the corresponding maximum operating voltage value and at least one processor constraint.

2. The processor of claim 1, wherein the plurality of coefficient values is obtained during initialization of the processor.

3. The processor of claim 1, wherein the power controller is to determine the operating voltage based on the number of active cores of the plurality of cores, and prevent a first core from execution at a dynamically changeable maximum operating voltage value associated with the number of active cores based on the at least one processor constraint.

4. The processor of claim 1, wherein the voltage calculation logic is to store the first dynamically changeable maximum operating voltage value in a first entry of a lookup table and to store the second dynamically changeable maximum operating voltage value in a second entry of the lookup table, the second storage comprising the lookup table.

5. The processor of claim 4, wherein the power controller is to access the first entry when the first number of active cores are active and to determine an operating voltage for the first number of active cores based at least in part on the first dynamically changeable maximum operating voltage value.

6. A non-transitory machine-readable medium having stored thereon instructions, which if performed by a machine cause the machine to perform a method comprising:
reading a set of coefficient values from a non-volatile storage of a processor;
calculating a set of dynamically changeable maximum operating voltage values, each of the set of dynamically changeable maximum operating voltage values calculated according to a different polynomial equation using the set of coefficient values and a different value for a number of active cores;
storing the set of dynamically changeable maximum operating voltage values in a table;
determining a dynamically changeable maximum operating voltage for the processor based on the number of active cores of the processor, responsive to a change in the number of active cores; and
computing a resolved operating voltage dynamically for the processor based on the dynamically changeable maximum operating voltage and at least one constraint of the processor.

7. The non-transitory machine-readable medium of claim 6, wherein the method further comprises accessing the table based on the number of active cores and obtaining the dynamically changeable maximum operating voltage from the table.

8. The non-transitory machine-readable medium of claim 7, wherein the method further comprises computing the resolved operating voltage to be the dynamically changeable maximum operating voltage when there are no constraints on the processor.

9. The non-transitory machine-readable medium of claim 6, wherein the method further comprises enabling a single core of the processor to operate at a first operating voltage, and thereafter enabling a plurality of cores of the processor to operate at a second operating voltage, the first operating voltage greater than the second operating voltage.

10. A system comprising:
a multicore processor including a plurality of cores, a storage to store a plurality of dynamically changeable maximum operating voltage values, each of the plurality of dynamically changeable maximum operating voltage values a function of a number of active cores, voltage calculation logic to calculate the plurality of dynamically changeable maximum operating voltage values, wherein the voltage calculation logic is to use a first polynomial equation, a first number of active cores and a plurality of coefficient values obtained from a non-volatile storage to calculate a first dynamically changeable maximum operating voltage value for the first number of active cores, and to use a second polynomial equation, a second number of active cores and the plurality of coefficient values to calculate a second dynamically changeable maximum operating voltage value for the second number of active cores, the first and second polynomial equations are different polynomial equations, and store the calculated plurality of dynamically changeable maximum operating voltage values in the storage, and a voltage control logic to dynamically control an operating voltage to be a corresponding one of the dynamically changeable maximum operating voltage values or a clip voltage value, the clip voltage value based on at least one of a plurality of processor constraints; and
a dynamic random access memory (DRAM) coupled to the multicore processor.

11. The system of claim 10, wherein the voltage control logic is to enable a single core of the plurality of cores to operate at a first operating voltage and enable two or more of the plurality of cores to operate at a second operating voltage, the first operating voltage greater than the second operating voltage.

12. The system of claim 10, wherein the storage comprises the non-volatile storage.

* * * * *